2,337,879

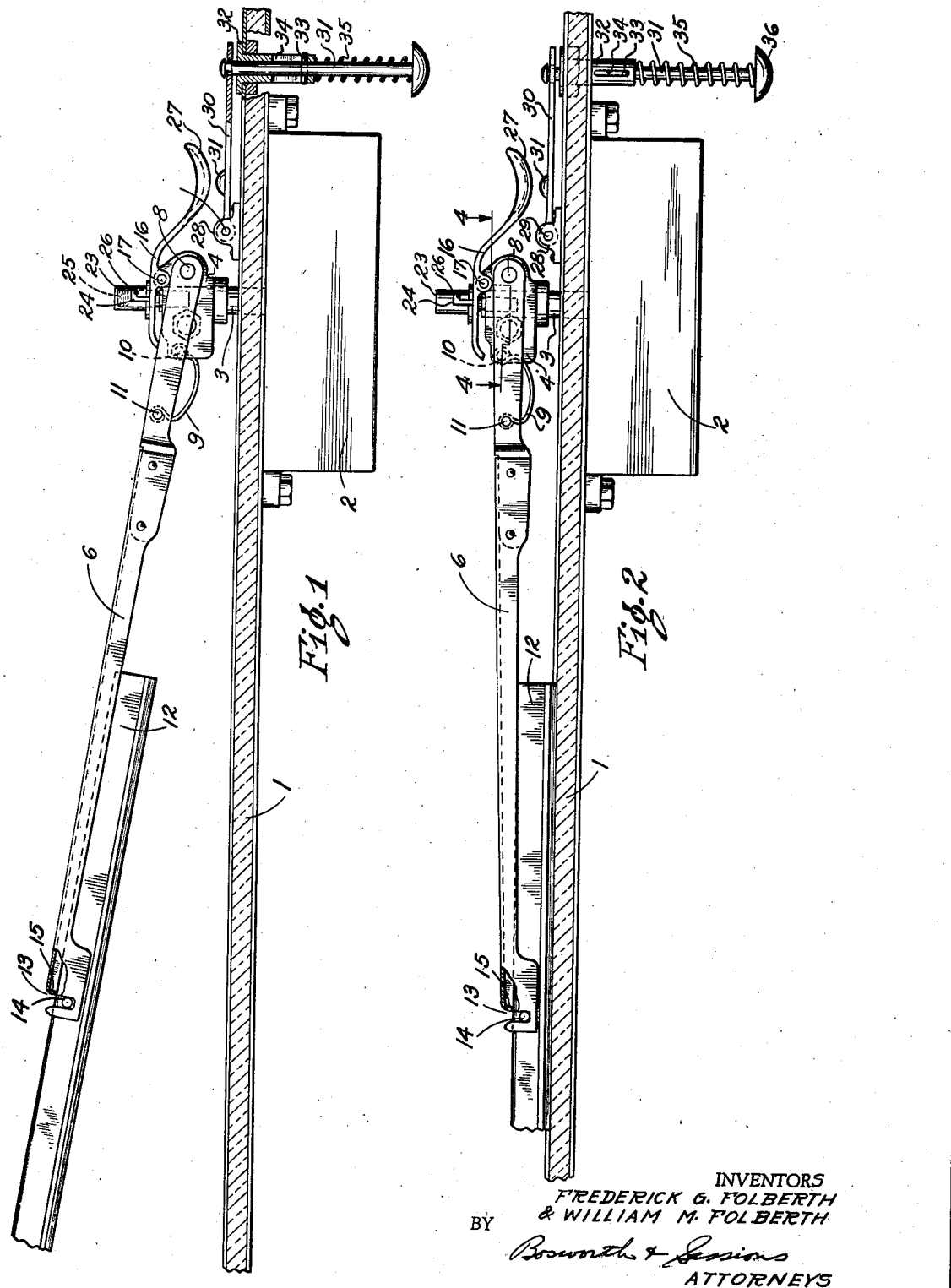

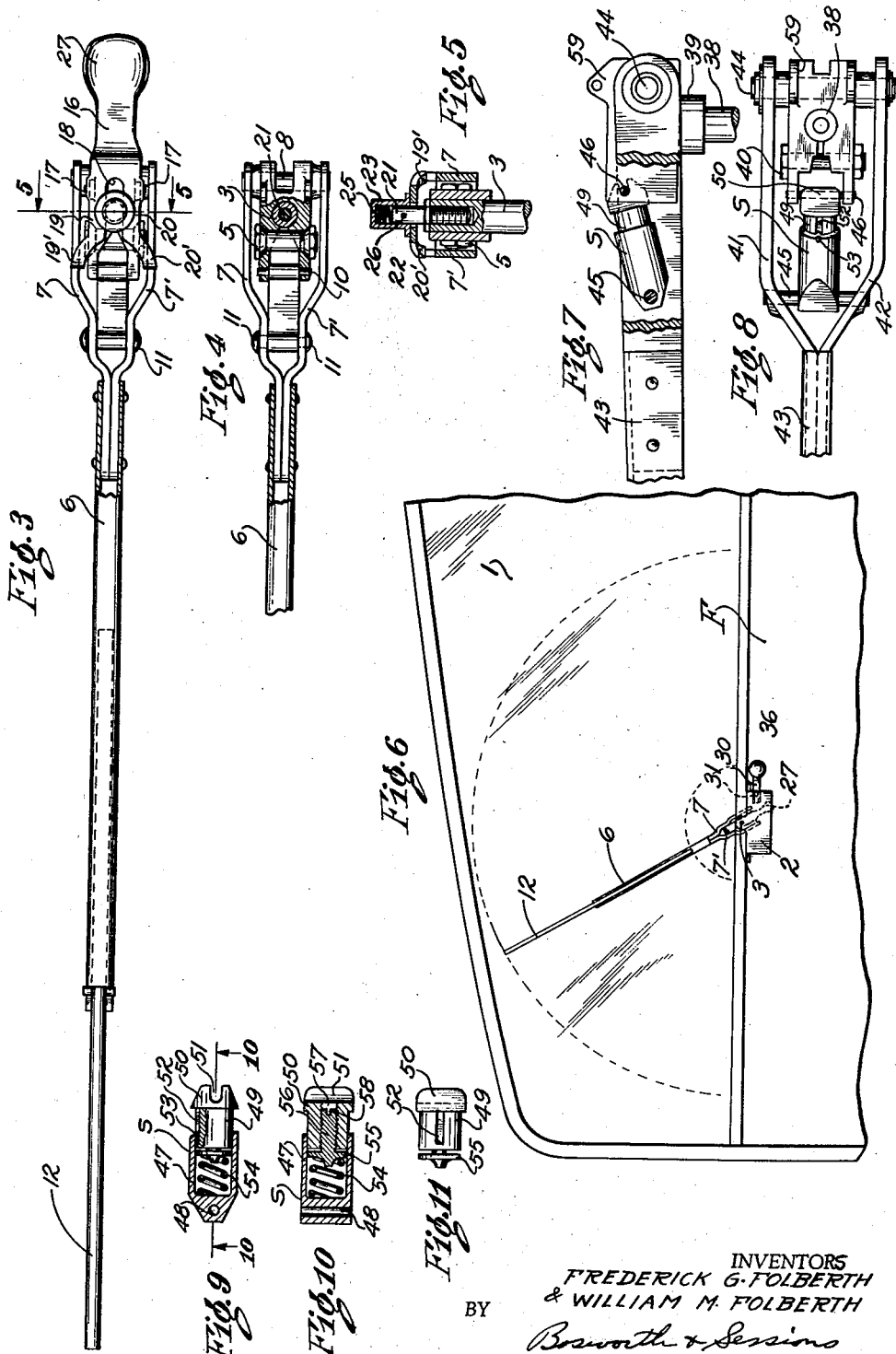
Dec. 28, 1943.  F. G. FOLBERTH ET AL  2,337,879
WINDSHIELD CLEANER ARM MECHANISM
Filed April 18, 1942  2 Sheets-Sheet 2
INVENTORS
FREDERICK G. FOLBERTH
& WILLIAM M. FOLBERTH
BY
Bosworth & Sessions
ATTORNEYS Patented Dec. 28, 1943

UNITED STATES PATENT OFFICE 2,337,879

WINDSHIELD CLEANER ARM MECHANISM

Frederick G. Folberth and William M. Folberth, Cleveland, Ohio

Application April 18, 1942, Serial No. 439,478

6 Claims. (Cl. 15—255)

This invention relates to windshield cleaning apparatus and more particularly to an improved squeegee or wiper blade supporting and operating mechanism.

In heavy-duty windshield cleaners of the type employed on air craft and high speed water craft, it is found desirable to employ a squeegee blade which is urged against the surface of the glass to be cleaned with considerably greater pressure than is usual and customary in the ordinary passenger automobile windshield cleaner. This additional pressure is desirable more effectively to clean the windshield, particularly under extremely high speed and heavy snow or ice conditions.

In view of the relatively high pressure with which the cleaning blade is urged against the windshield, it is found desirable to maintain the blade out of contact with the windshield except when the device is in actual operation. By retaining the cleaner blade out of contact with the surface to be cleaned except during operation, the injurious continual pressure against a rubber blade or the like is eliminated and freezing of the blade to the windshield while the device is not operating is prevented.

In our United States Patent No. 2,202,311 issued May 28, 1940, we have described and claimed an improved windshield wiper arm wherein a spring is employed which urges the squeegee blade against the windshield when the supporting arm is in one position or zone adjacent the windshield surface and which urges the supporting arm and squeegee blade away from the windshield when the blade is in another position or zone more remote from the windshield surface. In the present invention we may employ the general arrangement shown in our Patent No. 2,202,311 for causing the desired spring action of the windshield wiper arm but it will be understood that other spring arrangements, such as that illustrated in Figures 7 to 11 hereof, may be employed for urging the squeegee blade toward the windshield when in one position or zone and away from the windshield when in another position or zone.

It is among the objects of our invention to provide an improved windshield cleaner blade supporting mechanism whereby the blade is maintained retracted out of engagement with the glasss except during actual cleaning movement and may be moved into glass-engaging position from retracted position promptly upon starting of the cleaner driving motor. Other objects of our invention include the provision of a simple and rugged mechanism for a windshield cleaner arm which is adapted to hold the cleaner blade away from the glass when the motor is not operating and to move the blade into working engagement with the glass during the first stroke of the arm after the motor is turned on; the provision of a windshield cleaner arm support which will permit the arm readily to be moved completely away from the windshield to facilitate wiping or polishing thereof; the provision of manually operable means for causing the squeegee blade to move from retracted position into windshield-engaging position while the driving mechanism is in operation; and the provision of an adjustable spring mechanism for cleaner arm supports of the general type described in our said U. S. Patent No. 2,202,311.

The above and other objects of our invention will appear from the following description of one embodiment thereof, reference being had to the accompanying drawings in which:

Figure 1 is a plan view of our improved squeegee or cleaner blade supporting mechanism, a vehicle windshield and some of the associated parts being shown in cross section, and a squeegee blade being illustrated in retracted position.

Figure 2 is a view generally similar to Figure 1 but illustrating the squeegee blade in working position in engagement with the windshield glass.

Figure 3 is a detached end elevation of the squeegee arm supporting mechanism shown in Figures 1 and 2.

Figure 4 is a fragmentary view generally similar to Figure 3 but showing the parts as they appear when the arm operating lever is removed. The view is taken substantially on line 4—4 of Figure 2.

Figure 5 is a fragmentary cross sectional view taken on line 5—5 of Figure 3.

Figure 6 is a diagrammatic illustrative view showing the general arrangement of our improved apparatus on a windshield.

Figure 7 is a fragmentary side elevation, partly in section, illustrating a modified spring means for the cleaner supporting arm.

Figure 8 is an end view of the apparatus shown in Figure 7.

Figure 9 is a detached longitudinal cross sectional view of the spring unit shown in Figures 7 and 8.

Figure 10 is a longitudinal cross sectional view taken on line 10—10 of Figure 9.

Figure 11 is a detached view of the adjustable plunger portion of the spring mechanism shown in Figures 9 and 10.

Referring to the drawings, Figures 1 to 6 particularly, the glass panel 1 may be the windshield or other window area of a boat, automobile, airplane or other vehicle. We have illustrated a driving motor for the windshield cleaner mechanism at 2, and it will be understood that this is merely a diagrammatic showing of the motor which, of course, may be located as indicated or at a remote point with mechanical driving means such as suitable linkage for imparting oscillating rotational movement to the cleaner shaft 3. Secured to the shaft 3 and rotatable therewith is an arm supporting bracket generally indicated at 4. This bracket is preferably split and clamped onto the shaft 3 by means of a bolt 5 as is best seen in Figure 4.

The squeegee supporting arm 6 has a bifurcated inner end portion indicated at 7, 7' and the pin 8 forms a pivotal support on the bracket 4 for the inner end of arm 6. A spring 9, which may be made of beryllium copper or other suitable strong and resilient material, is secured at its inner end on a pin 10 which is mounted in the bracket 4 on the opposite side of the shaft 3 from the pivot pin 8, and the outer end of spring 10 has a pivotal connection on the pin 11 which extends across between the outer ends of the bifurcated legs 7 and 7' of the arm 6.

The resilient pivotal support and the cleaner arm just described is generally similar to the arrangement described and claimed in our above noted United States Patent No. 2,202,311, and it will be understood that when the parts are in the position shown in Figure 1, the spring 9 will urge the arm 6 outwardly away from the glass 1, while in the position shown in Figure 2 the spring 9 will urge the arm 6 inwardly toward the glass 1. It will be noted that, in Figure 1, a line drawn through the centers of the pins 8 and 11 passes outside of the pin 10 which forms the fixed support for the inner end of spring 9 while, in the position shown in Figure 2, such a line will pass on the inside of the fixed spring supporting pin 10.

The cleaner blade may take any suitable and desired form and is illustrated at 12. To support the blade the end of the arm 6 is slotted at 13 to accommodate a pin 14 on the blade 12, and the edge portion 15 of the outer end of the arm 6 engages the outer, preferably metal, backing portion of the blade 12 and serves to hold the blade in engagement with the glass when the parts are in the positions shown in Figure 2.

In order to limit the movement of the arm 6 axially of shaft 3 away from the glass 1 and to provide means for snapping the arm 6 and squeegee 12 into operating position against the glass 1 when desired, we provide a lever 16 which is pivotally supported on the bracket 4 at 17. The lever 16 is slotted at 18 to form two side portions 19 and 20. Projecting through the slot 18 is a stud 21 which is threaded at its lower end and is screwed into the upper end of the shaft 3 as seen in Figure 5. A lock nut 22 is provided to retain the stud 21 in position. The outer ends 19' and 20' of the lever 16 are spread apart and engage the end portions 7 and 7' of the arm 6 as is clearly seen in Figure 3.

In order to limit the swinging movement of lever 16 about its pivot 17, we provide a removable cap 23 which is held in place on the end of the stud by a bayonet slot 24. In the cap 23 there is a spring 25 and a pin 26 extends out from the stud 21 and holds the cap 23 in position. The flanged lower end 27 of the cap 23 forms a stop or abutment against which the arms 19 and 20 of the lever 16 engage when the parts are in the position shown in Figure 1. The opposite end of the lever 16 from the arms 19 and 20 is preferably formed with a convex generally spoon-shaped portion 27, the function of which will be later described.

As is best seen in Figure 6, the shaft 3 extends through the supporting structure F for the windshield and mounted on the outside of the frame structure F of the vehicle, preferably about in horizontal alignment with the point where the shaft 3 passes therethrough, is a bracket 28 which provides a pivotal support 29 for the operating lever 30 which carries the projecting boss 31 disposed in line with the path of the end 27 of the lever 16 during operation of the cleaner. In order to move the arm 30 into and out of operating position we provide a rod 31 which is pivotally connected to the end of the arm 30 and extends through a suitable bushing 32 in the vehicle frame structure F. The pin 33 is fixed in the rod 31 and operates in a slot 34 in the bushing 32 and serves to limit the in and out movement of the rod 31. Normally the rod 31 and arm 30 are held in retracted position, Figures 1 and 2, by the compression spring 35 which abuts at one end against the end bushing 32 and at its other end against the plunger head 36 of the rod 31.

Assuming that the parts are in the positions shown in Figure 1 and the driving means for the shaft 3 is not operating, it will be seen that the spring 9 will tend to move the arm 6 outwardly away from the glass 1. This movement is limited, however, by the engagement of the portions 7 and 7' of the arm 6 with the portions 19' and 20' of the lever 16 which in turn is held against further movement by the cap 23. If, with the parts in this position, the windshield cleaner driving mechanism is started, the shaft 3 will oscillate and the arm 6 will be given the usual reciprocating movement relative to the windshield. However, the arm 6 and squeegee 12 will still be held away from the glass 1 as explained above. In order to cause the cleaner blade 12 to engage the glass, the operator now pushes inwardly on the plunger head 36 of the rod 31 which moves the arm 30 outwardly about its pivotal support 29 into the path of the end 27 of the lever 16. When the end 27 of the lever 16 engages the rounded projection 31, the lever 16 is moved in counter-clockwise direction as seen in Figure 1. This movement causes the ends 19' and 20' to move the arm 6 in counter-clockwise direction about its pivot 8 and, when the line between the pivot 8 and the pin 11 passes over the pin 10, the spring 9 snaps-over or changes its action and is effective to move the arm 6 inwardly to cause the blade 12 to engage the windshield glass 1. As soon as this occurs, the operator releases the plunger 36 and the boss 31 is withdrawn out of the path of the end 27 of the lever 16 by spring 35 and the cleaner continues to function in the usual manner. By forming the end 27 of the lever 16 as described and by rounding the boss 31 the above action will occur regardless of the direction of movement of lever 16 when it engages boss 31.

When it is desired to reset the cleaner arm mechanism into the position shown in Figure 1 the operator manually swings the arm 6 away from the windshield until the spring 9 snaps over its dead center position (when line between pins 8 and 11 passes through pin 10) whereupon the parts will remain in the retracted position shown in Figure 1 until the lever 27 is again operated to return the arm 6 and squeegee 12 to cleaning position.

If it is desired to move the arm 6 still further away from the windshield than shown in Figure 1, the cap 23 is removed by pushing it inwardly and turning it to release the bayonet connection of the cap on the stud 21. With the cap 23 removed the arm 6 can be moved still farther away from the glass 1 as the limitation to movement of the lever 27 imposed by the cap 23 is removed and arm 6 can swing freely outwardly about pivot 8.

It will be seen from the above description that our cleaner arm supporting mechanism permits the wiper blade or squeegee to be held away from the windshield until it is desired to place the cleaner in use. The operator may then cause the blade to engage the windshield by merely starting the motor and pushing on the plunger 36. During this operation the operator need not leave his seat and thus the squeegee blade can be retained in retracted position until it is necessary to use the cleaner.

In Figures 7 to 11, inclusive, we illustrate a modified form of our windshield cleaner arm mechanism in which an adjustable spring unit, using a coil spring, is employed for urging the cleaner arm and wiper blade toward the windshield when the arm is adjacent thereto and away from the windshield when the arm is more remote therefrom.

The shaft 38 corresponds to the shaft 3 in Figure 1 and the bracket 39 is secured to the shaft by a bolt 40 in the same manner as the bracket 4 in Figure 1. The bifurcated end portions 41 and 42 of the cleaner arm 43 are pivotally mounted on a pin 44 secured to the bracket 39. The pin 45 is secured to and extends across the closed end of the yoke portion of the cleaner arm, and a pin 46 is supported in the bracket 39. These pins 45 and 46 correspond generally in location and function to the pins 10 and 11 of Figure 1.

Between the pins 45 and 46 we insert the adjustable spring unit which is generally indicated at S. This unit at all times exerts a force tending to push the pins 45 and 46 apart, and it will be understood that when a line drawn from the center of pin 45 through the center of pin 44 passes below the center of pin 46, as seen in Figure 7, the spring unit S will tend to rotate the arm 43 in counter-clockwise direction, and urge the cleaner blade into engagement with the windshield. When a line from pin 45 to pin 44 passes on the opposite side of pin 46, the spring unit S will, of course, tend to urge the arm 43 in the opposite direction or away from the windshield. The spring unit, as is seen in Figures 9, 10 and 11, comprises a tubular member 47 having a hole 48 extending transversely of the closed end thereof. When installed in operating position the pin 45 passes through the hole 48 forming a pivotal support for the member 47. A plunger member 49 extends into the open end of the tubular member 47, and has an enlarged head portion 50, slotted at 51 to fit over the pin 46. A groove 52 extends from adjacent the head 50 to a point short of the end of the member 49, and a lip 53 on the end of the tubular portion 47 is bent inwardly to have sliding engagement in the groove 52. Thus, after the plunger 49 is inserted into the tubular sleeve 47 and the lip 53 is bent downwardly as shown in Figure 9, the parts will be kept in assembled relation. The spring force is obtained by a coil spring 54 which is disposed within the tubular portion 47 and exerts a compressive force between the member 47 and the flanged head 55 of the adjusting screw 56.

As is clearly seen in Figure 10 the screw 56 has threaded engagement in a hole 57 which extends entirely through the plunger member 49. A screw driver slot 58 is formed on the inner end of the screw 56 and permits adjustment of this screw by inserting a screw driver in the hole 57 through the slot 51. Thus adjustment can be made without taking the unit apart.

It will be understood that by adjusting the position of the screw 56 the compression of the spring 54 may be adjusted, and the pressure of the cleaner blade against the windshield regulated to give the desired cleaning action. By making the spring 54 relatively heavy a heavy pressure of the blade on the glass can be obtained, which pressure is adjustable through a substantial range. In Figures 7 and 8 we have not illustrated the lever mechanism for causing the cleaner arm to be shifted from retracted position into operating position, but it will be understood that the lever 16 may be pivotally supported on the flanges 59 of the bracket 39 (Figure 7).

Although we have described the illustrated embodiments of our invention in considerable detail, it will be understood by those skilled in the art that various modifications may be made in the form and arrangement of our improved cleaner arm mechanism without departing from the spirit of our invention. We do not therefore wish to be limited to the particular apparatus herein shown and described but claim as our invention all embodiments thereof coming within the scope of the appended claims.

We claim:

1. In apparatus of the type described, a windshield cleaner arm, a squeegee blade supported by said arm, a shaft, means for pivotally supporting said arm on said shaft whereby said arm will rotate with said shaft and may be moved axially of said shaft, spring means adapted to urge said arm axially of said shaft in one direction when said arm is in one position and axially of said shaft in the opposite direction when said arm is in another position, a lever for limiting the movement of said arm in said one direction, and means for operating said lever to move said arm in said opposite direction until said spring is effective to urge said arm in said opposite direction.

2. In apparatus for cleaning windshields or the like a shaft extending out from the surface to be cleaned, a bracket member secured to said shaft, a squeegee supporting arm pivotally secured to said bracket, spring means adapted to urge said arm toward said surface into operating position when said arm is disposed adjacent said surface and to urge said arm away from said surface into retracted position when said arm is more remote from said surface, a lever pivotally supported on said bracket and movable toward and away from said surface, said lever having a portion adapted to engage said arm, means for limiting the movement of said lever away from said surface, and means, adapted to be moved into and out of position for engaging said lever, for moving said lever to move said arm from retracted position into operating position.

3. In apparatus for cleaning windshields or the like a shaft extending out from the surface to be cleaned, a bracket member secured to said shaft, a squeegee supporting arm pivotally secured to said bracket, spring means adapted to urge said arm toward said surface into operating position when said arm is disposed adjacent said surface and to urge said arm away from said surface into retracted position when said arm is more remote from said surface, a lever pivotally supported on said bracket and movable toward and away from said surface, said lever having a portion adapted to engage said arm, detachable means for limiting the movement of said lever away from said surface, the removal of said detachable means permitting said lever and said arm to be moved farther away from said surface, and means, adapted to be moved into and out of position for engaging said lever, for moving said lever to move said arm from retracted position into operating position.

4. In apparatus of the type described, a shaft, an arm pivotally supported for rotational movement with said shaft and axial movement relative thereto, a pin supported by said shaft and spaced from the pivotal support of said arm, a second pin carried by said arm and spaced from said first named pin, and spring means disposed between said pins and exerting a force tending to move said pins apart, said spring means including a member pivotally engaging one of said pins, a second member pivotally engaging the other of said pins, and a coil spring disposed between and engaging said members and supported thereby.

5. In apparatus of the type described, a shaft, an arm pivotally supported for rotational movement with said shaft and axial movement relative thereto, a pin supported by said shaft and spaced from the pivotal support of said arm, a second pin carried by said arm and spaced from said first pin, and spring means disposed between said pins and exerting a force tending to move said pins apart, said spring means including a member pivotally engaging one of said pins, a second member pivotally engaging the other of said pins, a coil spring disposed between and engaging said members and supported thereby, and adjustable means for regulating the distance between the parts of said members engaged by said spring whereby the force tending to move said pins apart may be varied.

6. In apparatus for cleaning windshields or the like, a shaft extending out from the surface to be cleaned, a squeegee supporting arm pivotally supported for rotational movement with said shaft and for movement with respect to said shaft toward and away from said surface, a pin supported by said shaft and spaced from the pivotal support of said arm, a second pin carried by said arm, and spaced from said first named pin, and spring means disposed between said pins and exerting a force tending to change the distance between said pins, said spring means including a member pivotally engaging one of said pins, a second member pivotally engaging the other of said pins, and a spring disposed between and engaging said members and supported thereby.

FREDERICK G. FOLBERTH.
WILLIAM M. FOLBERTH.